US006116743A

United States Patent [19]
Hoek

[11] Patent Number: 6,116,743
[45] Date of Patent: Sep. 12, 2000

[54] EXTENDABLE EXTERIOR REARVIEW MIRROR ASSEMBLY FOR VEHICLES

[75] Inventor: Steven G. Hoek, Holland, Mich.

[73] Assignee: Donnelly Corporation, Holland, Mich.

[21] Appl. No.: 09/399,875

[22] Filed: Sep. 20, 1999

[51] Int. Cl.[7] ................................................ G02B 7/182
[52] U.S. Cl. ...................... 359/871; 359/872; 359/874; 359/875; 359/877
[58] Field of Search .................... 359/871, 872, 359/874, 875, 877; 248/472, 537, 478, 479, 484

[56] References Cited

U.S. PATENT DOCUMENTS

| | | | |
|---|---|---|---|
| D. 285,549 | 9/1986 | Haack | D12/187 |
| D. 331,216 | 11/1992 | McGouldrick | D12/187 |
| 3,118,965 | 1/1964 | Jones | 88/93 |
| 3,119,591 | 1/1964 | Malecki | 248/282 |
| 3,420,490 | 1/1969 | Malachowski | 248/486 |
| 4,135,694 | 1/1979 | Stegenga et al. | 218/478 |
| 4,315,614 | 2/1982 | Stegenga et al. | 248/479 |
| 4,730,913 | 3/1988 | Boothe | 350/604 |
| 4,740,066 | 4/1988 | Whitehead | 350/604 |
| 4,789,232 | 12/1988 | Urbanek | 350/632 |
| 4,793,582 | 12/1988 | Bronstein et al. | 248/486 |
| 4,815,836 | 3/1989 | Byers et al. | 350/604 |
| 4,907,871 | 3/1990 | Hou | 350/639 |
| 4,911,545 | 3/1990 | Miller | 350/604 |
| 4,921,337 | 5/1990 | Hou | 350/604 |
| 4,998,812 | 3/1991 | Hou | 350/604 |
| 5,028,029 | 7/1991 | Beck et al. | 248/479 |
| 5,061,056 | 10/1991 | You | 359/872 |
| 5,096,283 | 3/1992 | Croteau | 359/865 |
| 5,217,197 | 6/1993 | Spitzer | 248/479 |
| 5,292,100 | 3/1994 | Byers et al. | 248/480 |
| 5,432,640 | 7/1995 | Gilbert et al. | 359/841 |
| 5,483,385 | 1/1996 | Boddy | 359/841 |
| 5,489,080 | 2/1996 | Allen | 248/480 |
| 5,513,048 | 4/1996 | Chen | 359/881 |
| 5,546,239 | 8/1996 | Lewis | 359/855 |
| 5,572,376 | 11/1996 | Pace | 359/877 |
| 5,623,374 | 4/1997 | Montanbault | 359/841 |
| 5,760,977 | 6/1998 | Leder et al. | 359/841 |

FOREIGN PATENT DOCUMENTS 2013178   9/1990   Canada.

*Primary Examiner*—Cassandra Spyrou
*Assistant Examiner*—Mohammad Y. Sikoer
*Attorney, Agent, or Firm*—Van Dyke, Gardner, Linn & Burkhart, LLP

[57] ABSTRACT

An extendable exterior rearview mirror assembly includes a mounting bracket, a mirror subassembly, and a support arm which is supported by the mounting bracket. The mirror subassembly is supported by the support arm and is mounted for selective movement along the support arm to one of a plurality of viewing positions. The mirror subassembly includes a housing, a reflective element, and an actuator which supports the reflective element in the housing. The actuator is mounted to the housing by an actuator bracket. The rearview mirror assembly further includes a biasing member which urges the support arm into frictional engagement with the actuator bracket to limit movement of the mirror subassembly along the support arm. In preferred form, the biasing member comprises a plate spring having an undulating cross-section which urges the support arm into frictional engagement with the actuator bracket while absorbing manufacturing tolerances of the actuator bracket and the support arm.

51 Claims, 6 Drawing Sheets

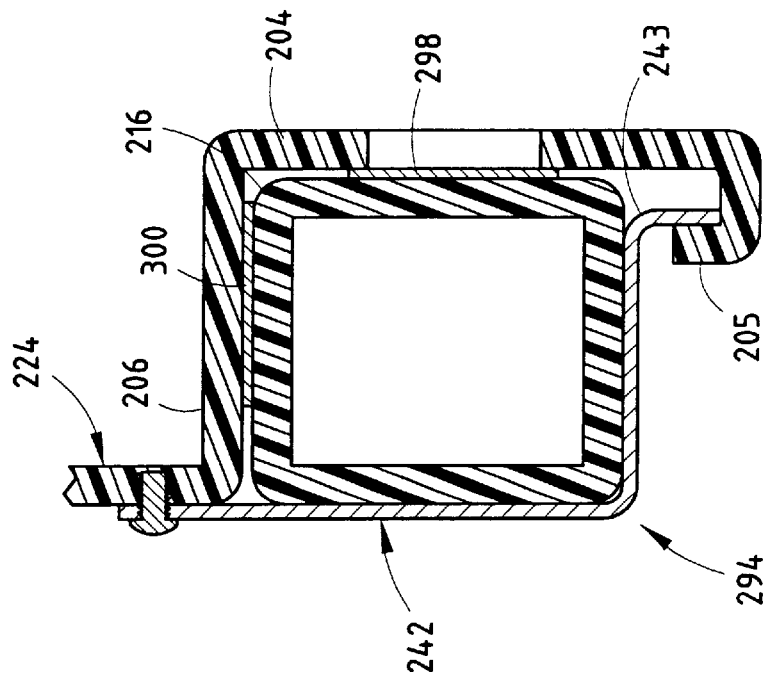
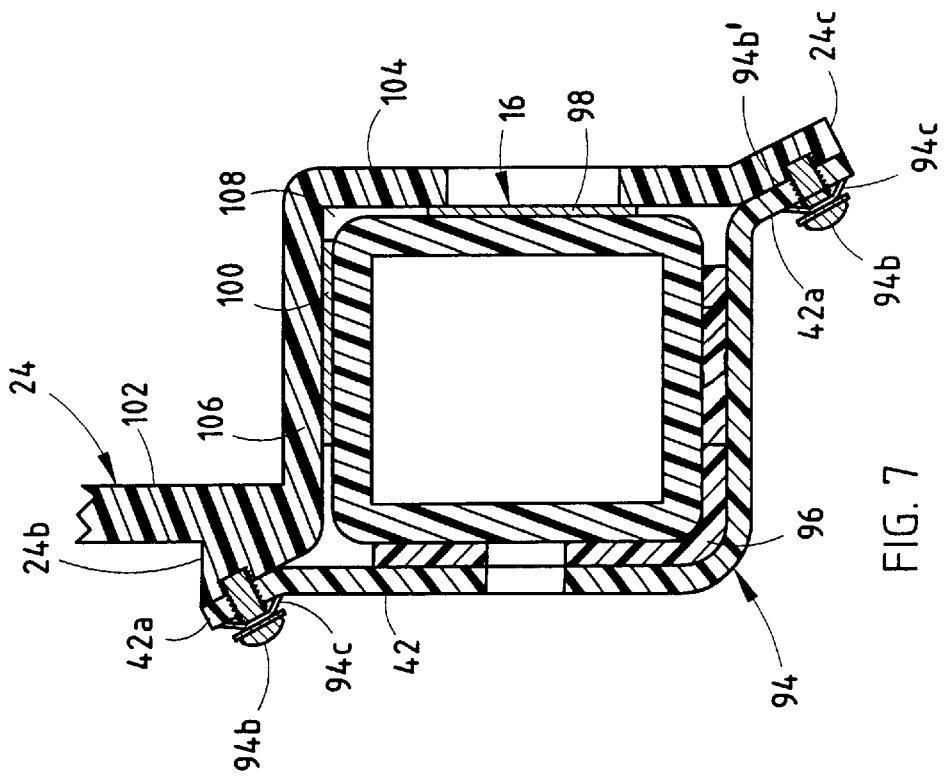

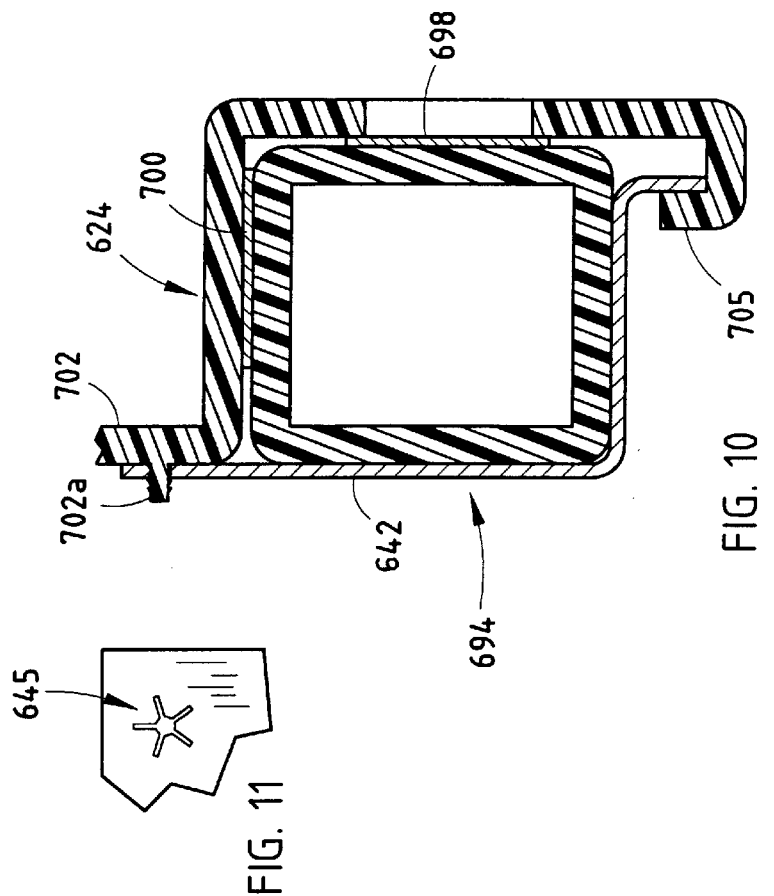
FIG. 10
FIG. 11
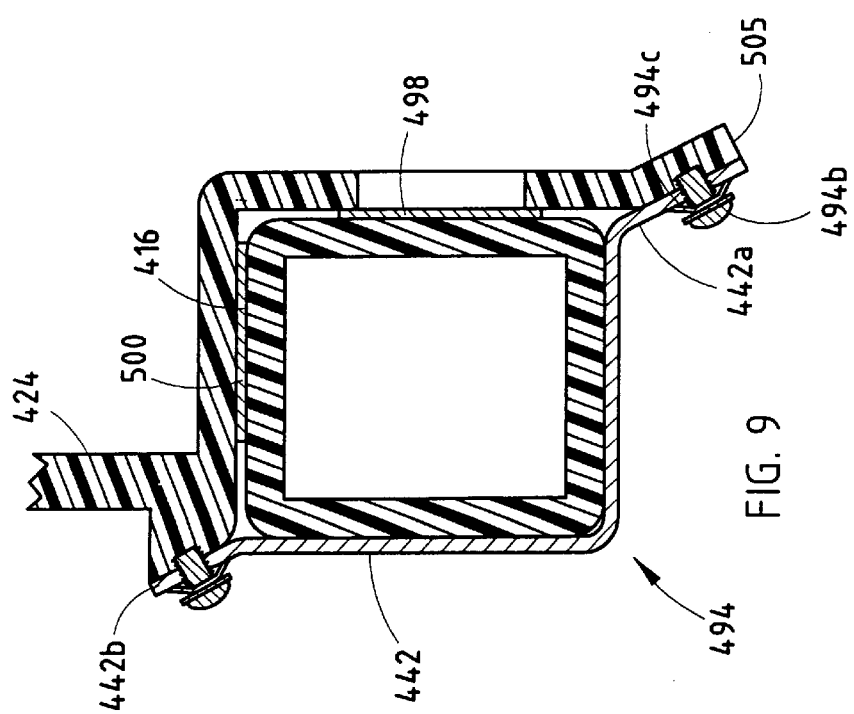
FIG. 9

EXTENDABLE EXTERIOR REARVIEW MIRROR ASSEMBLY FOR VEHICLES

TECHNICAL FIELD AND BACKGROUND OF THE INVENTION

The present invention relates to an exterior rearview mirror for mounting on a vehicle and, more particularly, to an extendable exterior rearview mirror for mounting on a vehicle which can be extended when the vehicle is being used for towing, for example towing a trailer, camper, or the like.

Until recently, towing mirrors included a fixed support or frame, which was rigidly mounted to the vehicle body, and a reflective element supported on and spaced from the vehicle body by the support or frame to provide rearview viewing of the towed object. For example, U.S. Pat. No. 3,119,591 to A. J. Malecki illustrates a typical rigidly mounted towing mirror assembly. However, these fixed extended rearview mirror assemblies increase the width of the vehicle often hampering normal maneuvering through passages including garage door openings, drive-through services, and the like. Furthermore, they are more vulnerable to being damaged or causing damage than conventional exterior rearview mirrors especially when used by an inexperienced driver. In some cases, the width of the vehicles was increased beyond the maximum width allowed by conventional vehicle transport trucks which deliver the vehicles to the dealership. Therefore, these mirror assemblies often required installation at the dealership which ultimately increased the cost of the vehicle.

More recently, several extendable exterior rearview mirrors have been developed. For example, in U.S. Pat. No. 5,513,048 to Chen and U.S. Pat. No. 5,489,080 to Allen, extendable rearview mirrors are disclosed which include telescoping members. The position of the mirror subassembly, which includes a reflective element and reflective element housing, is fixed in position by threaded fasteners, which require tools for adjustment. However, these assemblies tend to increase the vibration of the mirror assembly especially when the mirror subassembly is in the outboard position.

Consequently, there is a need for an extendable rearview mirror assembly that can provide for an extended field of view when towing and yet can be retracted to a normal operating position where it does not hamper maneuverability of the vehicle. In addition, the extendable rearview mirror assembly should have minimal impact on the vibration characteristics of the mirror assembly and be relatively easy to adjust between non-towing and towing positions without the need for tools.

SUMMARY OF THE INVENTION

Accordingly, the present invention provides an improved vehicular extendable exterior rearview mirror assembly which is especially suitable for use on vehicles when towing. The exterior rearview mirror assembly is adjustable to a plurality of viewing positions between a normal non-towing use position and a fully extended position, allowing an adjustable field of view to the rear of the vehicle. Additionally, the mirror assembly may include a break-away assembly to permit the mirror assembly to be folded to a break-away position in the event the mirror assembly strikes an object. Furthermore, the mirror assembly may include a power fold mechanism which allows the mirror subassembly to be folded or retracted to a folded position when the vehicle is driven into tight spaces, for example parking garages and the like.

According to one aspect of the invention, the extendable exterior rearview mirror assembly includes a mounting bracket, a mirror subassembly, and a support arm mounted for pivotal movement on the mounting bracket. The mirror subassembly is supported by the support arm and is mounted for selective movement along the support arm to one of a plurality of viewing positions. The rearview mirror assembly further includes a biasing member which urges the support arm into frictional engagement with the mirror subassembly to limit movement of the mirror subassembly along the support arm, with the movement of the mirror subassembly along the support arm being independent from the pivotal movement of the support arm about the mounting bracket.

In one aspect, the mirror subassembly further includes an actuator, which supports the reflective element in the housing of the mirror subassembly. The actuator provides adjustment to the orientation of the reflective element about at least one axis. Furthermore, the mirror subassembly may include an actuator bracket, which mounts the actuator in the housing of the mirror subassembly. The biasing member urges the support arm into frictional engagement with the actuator bracket to limit the movement of the mirror subassembly along the support arm.

In other aspects, the biasing member comprises at least one plate spring, with the plate spring having an undulating cross-section and urging the support arm into frictional engagement with the mirror subassembly. The undulating cross-section absorbs manufacturing tolerances of the support arm and of the mirror subassembly. In further forms, a second plate spring is provided. The second plate spring also has an undulating cross-section and together with the first plate spring urges the support arm into frictional engagement with the mirror subassembly.

In yet other aspects, the actuator bracket includes a clamp, which supports the support arm against the biasing member. For example, the clamp may comprise an L-shaped clamp, with the L-shaped clamp and the body of the actuator bracket defining a longitudinal passage. The support arm extends into the longitudinal passage, with the biasing member urging the support arm into frictional engagement with the clamp. Preferably, the biasing member comprises a plate spring having an undulating cross-section. The clamp, for example, may include a metal bearing surface, with the biasing member urging the support arm into frictional engagement with the metal bearing surface. The metal bearing surface may be provided by a metal insert which is placed between the support arm and the clamp.

In yet another aspect, the extendable exterior rearview mirror assembly further includes a driver assembly, with the driver assembly selectively moving the mirror subassembly along the support arm. For example, the driver assembly may include a threaded rod extending through the support arm and a drive motor, with the drive motor coupling to the threaded rod and moving the mirror subassembly along the support arm. Preferably, the driver assembly further includes a clutch, which drivingly decouples the motor from the threaded rod to provide a manual override of the drive motor.

In another form of the invention, an extendable exterior rearview mirror assembly includes a mounting bracket and a mirror subassembly having a housing, a reflective element and an actuator supporting the reflective element in the housing, with the actuator being mounted to the housing by an actuator bracket. The rearview mirror assembly further includes a support arm and a biasing member. The mirror subassembly is supported by the support arm. The biasing member urges the support arm into frictional engagement with the actuator bracket to limit movement of the mirror subassembly along the support arm.

In one aspect, the mirror subassembly includes a second reflective element. The first reflective element may comprise a flat, convex, or multiradiused/aspheric reflective element. The second reflective element preferably comprises a convex or multiradiused/aspheric reflective element.

In other aspects, the biasing member comprises a plate spring with an undulating cross-section. Further, the actuator bracket may include a longitudinal passage, with the support arm extending into the longitudinal passage and being urged into frictional engagement with the actuator bracket by the biasing member. For example, the actuator bracket may include a clamp for frictionally holding the support arm in the longitudinal passage to limit the movement of the mirror subassembly along the support arm.

As will be understood, the exterior rearview mirror assembly of the present invention provides numerous advantages over prior known extendable rearview mirror assemblies. The exterior rearview mirror assembly provides a plurality of extended positions to provide an adjustable extended field of view and, yet can be retracted to a normal operating position where it does not hamper the maneuverability of the vehicle or increase the width of the vehicle. Moreover, the extendable rearview mirror assembly of the present invention has minimal impact on the vibration of the mirror assembly. In addition, the exterior rearview mirror assembly can be adjusted to a plurality of extended positions either manually or by the use of a remote control within the vehicle cabin.

These and other objects, advantages, purposes and features of the invention will become more apparent from the study of the following description taken in conjunction with the drawings.

BRIEF DESCRIPTION OF THE DRAWINGS

FIG. 7 is an enlarged partial cross-sectional view taken along line VII—VII of FIG. 4;

FIG. 8 is a similar view to FIG. 7 illustrating the mounting arrangement of the second embodiment of the support arm mounting arrangement of FIG. 6;

FIG. 9 is a similar view to FIG. 7 illustrating a third embodiment of the mounting arrangement of the support arm of the mirror assembly;

FIG. 10 is a similar view to FIG. 7 illustrating a fourth embodiment of the mounting arrangement of the support bracket of the mirror assembly; and FIG. 11 is an enlarged view of the connection of the support arm assembly of FIG. 10 as viewed along line XI—XI in FIG. 10.

DESCRIPTION OF THE PREFERRED EMBODIMENTS

Figure 1:
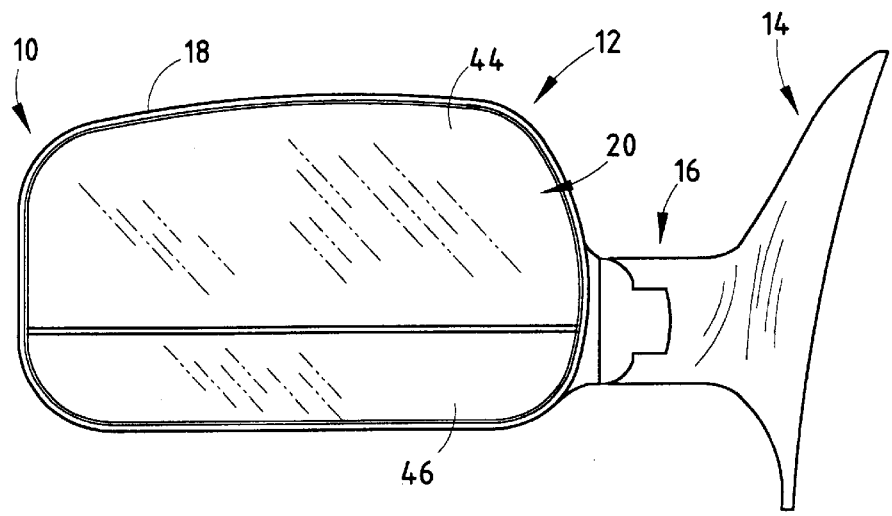
FIG. 1 is a front elevation view of an extendable exterior rearview mirror assembly of the present invention.

Referring to FIG. 1, an exterior rearview mirror assembly 10 of the present invention is illustrated. Rearview mirror assembly 10 includes a mirror subassembly 12 which is mounted to a mirror mounting bracket 14 by a mono support arm 16. As will be more fully described below, mirror support arm 16 provides for extension of mirror subassembly 12 to a plurality of extended positions from mirror mounting bracket 14 so that the occupant of the vehicle can have an adjustable extended field of view rearward of the vehicle. Furthermore, mounting bracket 14 preferably comprises a break-away mounting assembly, such that mirror subassembly 12 can be moved from a normal operating position (shown in solid in FIG. 3) toward a folded, break-away position adjacent the vehicle body (shown in phantom in FIG. 3).

Figure 4:
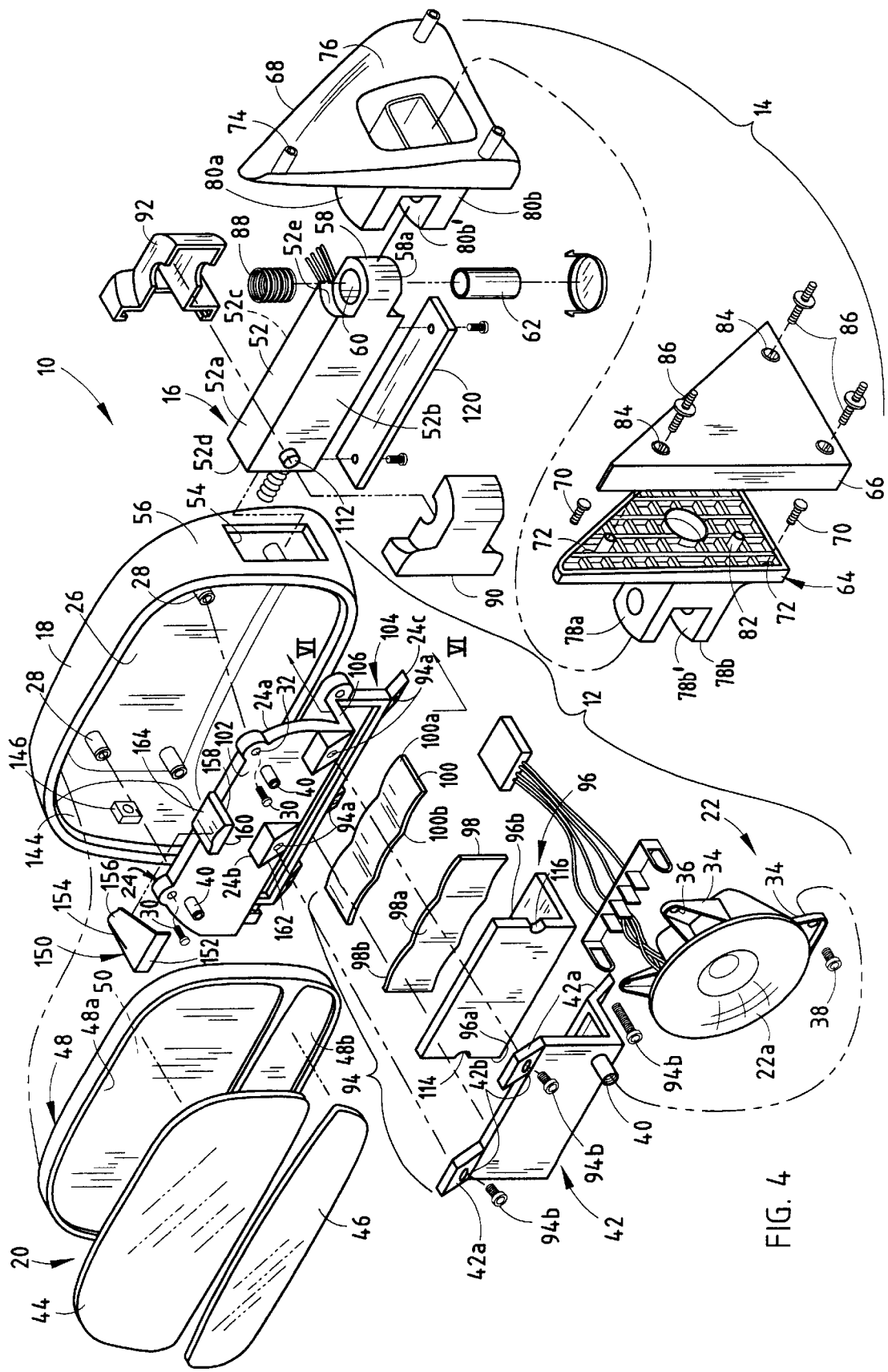
FIG. 4 is an exploded perspective view of the mirror assembly of FIG. 1.

As best seen in FIGS. 1 and 4, mirror subassembly 12 includes a mirror casing or housing 18 and a reflective element assembly 20, which is mounted in housing 18 by a positioning device 22, preferably an electrical actuator. It should be understood that other positioning devices may be used, including manually operated actuators, a remote manually operated actuator, such as a BODEN cable actuator or the like. Housing 18 is preferably injection molded from a suitable plastic, such as nylon, acrylonitriale butadiene styrene (ABS) or suitable resinous plastic, or the like which is commercially available under the trademark TER-LURAN KR2889® by BASF Company of Wyandotte, Mich. Alternatively, other resinous, melt processable plastics or moldable materials such as mineral filled or glass filled nylon or polyester or polypropylene can be used to form housing 12. A suitable nylon is 13% glass modified nylon 6:6 sold as ZYTEL 71G13L® by I.E. DuPont de Nemours & Company of Wilmington, Del. or PA123G13BK-47 by Bay Resins, Inc. of Millington, Md. A suitable polypropylene is TENITE P6M4Z-007® by Eastman Chemical Products of Kingsport, Tenn. Alternately, housing 18 may comprise a reinforced nylon plastic, thermo plastic, polypropylene, or other similar thermo plastic or thermoset materials.

Referring to FIG. 4, actuator 22 is mounted to mirror housing 18 by an actuator bracket 24, which is rigidly mounted to a rear wall 26 of housing 18 on a plurality of mounting bosses 28 by fasteners 30. Fasteners 30 extend through respective mounting openings 32 provided in actuator bracket 24. In this manner actuator bracket 24 is rigidly mounted to mirror housing 18. To mount actuator 22 to bracket 24, actuator 22 includes a plurality of mounting tabs 34, which include mounting openings 36 for receiving fasteners 38 which extend through tabs 34 to secure actuator assembly 22 to mounting bosses 40 provided on actuator bracket 24 and further on clamp 42, which will be more fully described below.

Actuator 22 supports reflective element assembly 20 and preferably provides for multi-axis positioning of reflective assembly 20. As best seen in FIG. 4, reflective element assembly 20 includes a first reflective mirror element 44 and a second reflector element 46. Each reflective mirror element 44 and 46 may comprise a conventional nonelectro-optic flat or planar reflective mirror element or a convex or multiradiused/aspheric reflective mirror element. In preferred form, reflective element 44 comprises a flat or planar reflective element while reflective element 46 comprises a convex or multiradiused/aspheric reflective element to provide a spotter mirror. For example, each reflective element may comprise a metallic reflector coated glass or plastic substrate, such as a thin chromium alloy reflector coating or a non-metallic reflector coating such as the dichroic layer described in U.S. Pat. No. 5,207,492 to Roberts et al. or a reflector comprising a silicon reflective layer such as described in U.S. Pat. No. 5,535,056 to Caskey et al. which are herein incorporated by reference in their entireties. Alternately, the reflective elements may comprise a variable reflective electro-optic element, such as an electrochromic mirror element comprising one of several types of electrochromic elements, for example an element of the electrochemichromic type which is disclosed in U.S. Pat. No. 5,140,455 issued to Varaprassad et al. or maybe the solid state type such as disclosed in, for example, U.S. Pat. No. 4,712,879 issued to Niall R. Lynam et al.; U.S. Pat. No. 5,910,854; and U.S. patent application Ser. No. 08/238,521, filed Mar. 5, 1994, by Varaprassad et al. now U.S. Pat. No. 5,668,663, all commonly assigned with the present application to Donnelly Corporation of Holland, Mich., the disclosures of which are herein incorporated by reference in their entireties. Reflective assembly 20 further includes a reflective element holder 48 which includes first and second recessed support surfaces 48a and 48b for the respective reflective elements and on which the respective reflective elements are secured by, for example, an adhesive, adhesive tape, or the like. Actuator 22 includes a movable member 22a which is mounted to the rearward surface 50 of reflective element holder 48 to provide adjustment of the orientation of the reflective elements about one or more axes and, more preferably, about horizontal and vertical axes, as will be understood by those skilled in the art.

Support arm 16 includes an elongated body 52, which extend into housing 18 through an opening provided in end wall 52d of housing 18. Support arm 16 further includes a mounting portion 58 which includes a transverse bore 60 for receiving a mounting bushing 62 which pivotally mounts support arm 16 to mounting bracket 14. Support arm 16 preferably comprises a reinforced elongate box shaped member preferably formed from a suitable plastic, for example thermo plastic resin, or may be an aluminum or zinc die casting. As best understood from FIGS. 4 and 5, arm 16 includes a top wall 52a, opposed side walls 52b, 52c, and two end walls 52d, 52e. Extending transversely between side walls 52b, 52c and top wall 52a are a plurality of spaced reinforcing webs 118 which create interstices or openings therebetween. Reinforcing webs 118 increase the stiffness of arm 16 without the corresponding increase in weight normally associated with a solid support arm.

In the illustrated embodiment, mounting bracket 14 includes a base 64, a base gasket 66, and a base cover 68. Base cover 68 is secured to base 64 by fasteners 70, which extend through mounting openings 72 provided in base 64 and into corresponding mounting bosses 74 provided on the inner surface 76 of base cover 68. Projecting outwardly from base 64 are a pair of upper and lower mounting flanges or ears 78a and 78b, which extend into a corresponding pair of upper and lower flange covers or hollow ears 80a and 80b which project outwardly from base cover 68. Bushing 62 extends between upper and lower mounting flanges 78a and 78b and is preferably journaled in both upper and lower mounting flanges 78a and 78b to load both flanges. Previous designs with bushings journaled in only one bracket flange have exhibited vibration performance degradation. With both ends of the bushing journaled in the mounting flanges, the mounting flanges are subjected to reduced bending moments, thus reduced wear and tear on the connection. Extending rearwardly from base 64 are a plurality of mounting bosses 82, which align with corresponding mounting openings 84 provided in base gasket 66, which receive a corresponding plurality of mounting fasteners 86 which secure base 64 and, in turn, cover 68 directly to the vehicle, for example the vehicle door frame or panel.

Figure 3:
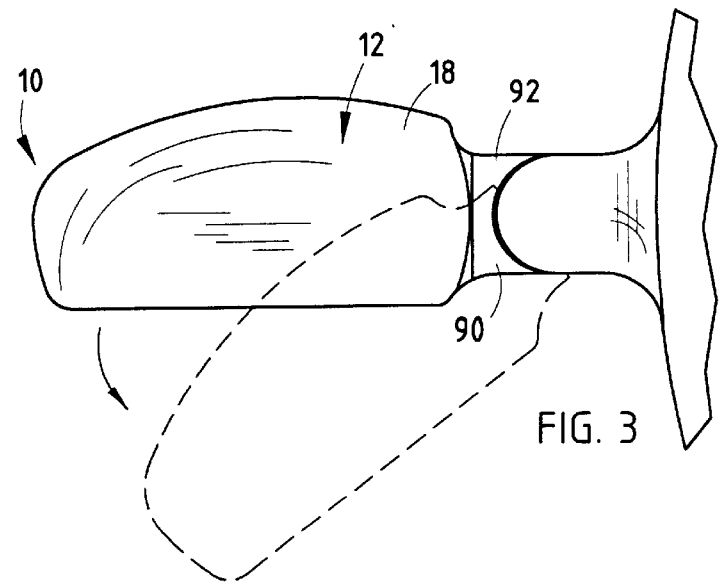
FIG. 3 is a plan view of the mirror assembly of FIG. 1 illustrating the mirror subassembly in a folded position.

In order to fix the position of mirror subassembly 12, mirror mounting bracket 14 includes a spring 88, which biases the lower surface 58a of mounting flange 58 into frictional engagement with the upper surface 80b' of lower flange cover 80b. In this manner, in order to move mirror subassembly 12 and support arm 16 to a folded, break-away position, as shown in FIG. 3, a force must be applied to mirror subassembly 12 or support arm 16 to overcome the friction between mounting flange 58 and lower flange cover 80b and to compress spring 88. It should be understood, that other break-away mounting arrangements may be used to mount support arm 16 to mounting bracket 14.

Figure 2:
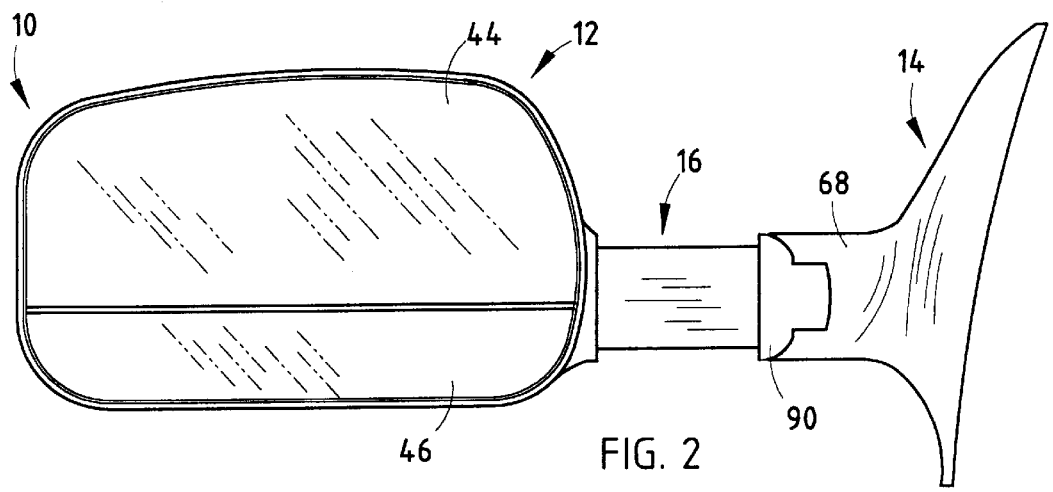
FIG. 2 is a similar view to FIG. 1 with a mirror subassembly in an extended position.

As best seen in FIGS. 1, 2, and 4, mirror assembly 10 preferably includes support arm covers 90 and 92 which extend over mounting portion 58 and over an end portion of elongated body 52 and are preferably sized such that when mirror housing is in its retracted position, covers 90, 92 abut housing 18 and base cover 68 and together form a substantially continuous outer shell which provides an aesthetic mirror assembly and further reduces the aerodynamic drag of the mirror assembly.

Figure 5:
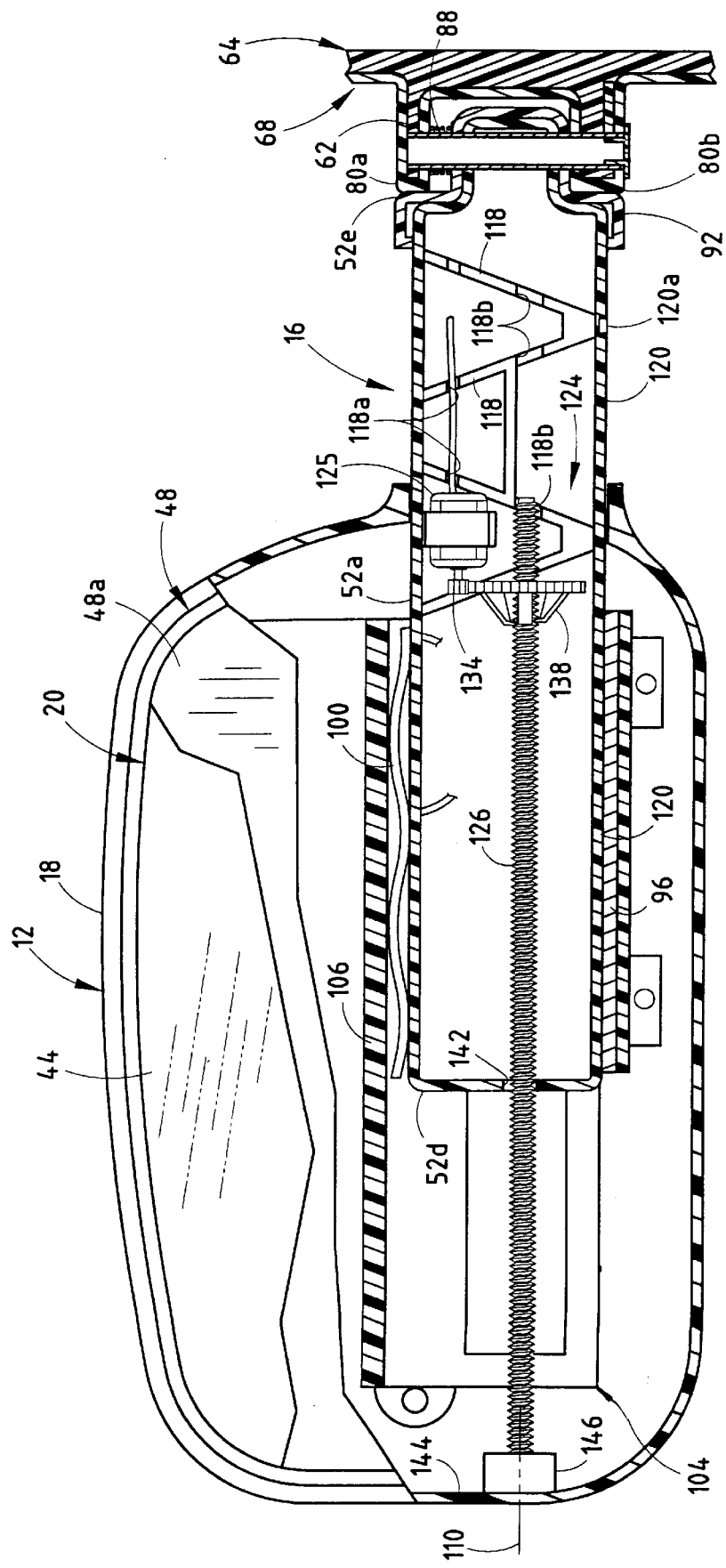
FIG. 5 is a partial cross-section view of the exterior rearview mirror assembly of FIG. 1 illustrating an optional driver assembly of the present invention.
Figure 6:
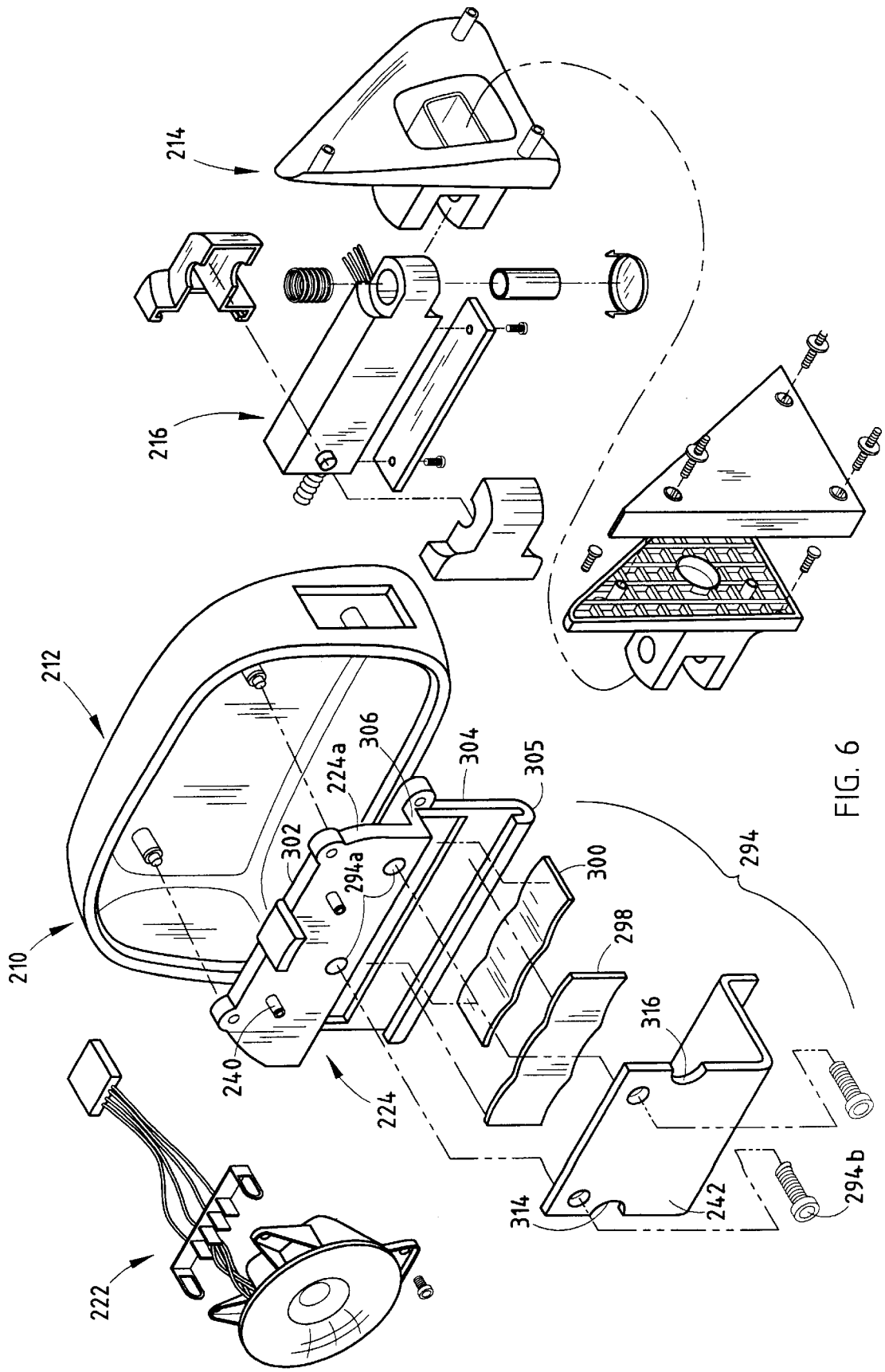
FIG. 6 is an exploded perspective view of a second embodiment of the support arm mounting arrangement.

As previously described, support arm 16 extends into opening 54 of housing 18 and is further mounted to actuator bracket 24. Actuator bracket 24 includes a clamp assembly 94 for frictionally holding support arm 16. Clamp assembly 94 includes clamp member 42, a bearing member 96, and a pair of plate springs 98 and 100. Referring to FIGS. 4, 5, and 7, actuator bracket 24 includes a body 24a with an upper planar portion 102 and a lower frame portion 104 which is offset toward rearwall 26 of housing 18 by a generally horizontal web 106 which together with lower frame portion 104 and clamp assembly 94, define a support arm receiving passage 108 (FIG. 7). Clamp 42 and bearing member 96 comprise L-shaped members and are secured to respective mounting openings 94a provided on body 24a of bracket 24 by fasteners 94b and belleville or compression washers 94c to provide vertical and lateral support for arm 16 against web 106 and lower frame portion 104. In the illustrated embodiment, actuator bracket 24 includes angled mounting blocks 24a and downwardly depending mounting tabs 24b with openings 94a formed therein for receiving fasteners 94b. Further, clamp 42 includes upper and lower mounting tabs 42a with respective mounting openings 42b through which fasteners 94b extend to secure clamp 42 to actuator bracket 24. Bearing member 96 is preferably a metal bearing member, for example stainless steel, which provides a smooth guide surface for arm 16 when arm 16 is moved through passage 108. Clamp 42 and the body of actuator bracket 24 is preferably a plastic material similar to housing 18. Plate springs 98 and 100 preferably comprise metal wave springs, for example spring steel springs, which include undulating or sinusoidal cross-sections to form opposed contacting surfaces 98a, 98b, 100a, and 100b, respectively, to clamp support arm 16 between springs 98, 100 and bearing member 96 in passage 108. Thus springs 98, 100 apply a biasing force to support arm 16 to urge support arm 16 into frictional engagement with bearing member 96, as will be more fully described below.

As best seen in FIG. 7, support arm 16 extends into passage 108 and is frictionally held in place by clamp member 42 and bearing member 96 and further by wave springs 100 and 98, which are respectively positioned beneath web portion 106 and adjacent lower frame portion 104. Wave spring 98 and 100 urge support arm 16 into frictional engagement with bearing member 96 to limit movement of mirror subassembly 12 along support arm 16. When a force sufficient to overcome the friction between support arm 16 and bearing member 96 is applied to mirror subassembly 12 along an axis of extension 110, mirror subassembly 12 moves along support arm 16 to a desired location along support arm 16 in one of at least two viewing positions and, more preferably, in one of a plurality of viewing positions between the fully retracted position and the fully extended position until the force is released. The outermost or fully extended position is defined by a stop 112 which projects from side 52b of elongated body 52 and which abuts a notch 114 provided on outer edge 96a of bearing member 96. In order to provide a symmetrical bearing member 96 that can be used on either a right hand side or left hand side exterior rearview mirror assembly, bearing member 96 preferably includes a second notch 116 on opposed free edge 96b to provide a stop for a right hand mirror assembly (not shown).

As previously noted, wave springs 98, 100 preferably comprise metal wave springs, and more preferably comprise stainless steel wave springs. Similarly, bearing member 96 preferably comprises a metal bearing member, and more preferably a stainless steel bearing member to provide a smooth contact between bearing member 96 and support arm 16. As best seen in FIG. 5, wave springs 98, 100 bear on support arm 16 with contacting surfaces 98a and 100a at discrete lines or points of contact. Since springs 98 and 100 have undulating cross-sections, springs 98 and 100 permit varying compression across their lengths and, further, can accommodate lateral movement perpendicular to their axis of compression. Because springs 98 and 100 provide varying compression, springs 98 and 100, therefore, are able to absorb manufacturing tolerances of the various components, including the actuator bracket 24, support arm 16, clamp 42, and bearing member 96 while maintaining a sufficient biasing force to provide substantially uniform friction between support arm 16 and actuator bracket 24 so that mirror subassembly 12 will exhibit a substantial uniform stiffness in its various viewing positions.

As best seen in FIG. 15, support arm 16 preferably comprises a hollow support arm which is reinforced by webs or ribs 118; thus, support arm is sufficiently stiff and yet light weight to reduce the overall weight of the exterior rearview mirror assembly 10. Furthermore, support arm 16 preferably includes a cover 120 which is secured to ribs 118 by fasteners 120a to enclose the space or interstices 122 between the ribs 118 so that when subassembly 12 is fully extended the hollow design of arm 16 will be hidden from view. Additionally, ribs 118 preferably include a plurality of openings 118a, 118b which are respectfully aligned to form transverse passages through arm 16 to permit wiring to extend through the arm to power various electrical devices in mirror subassembly 12 and further to permit a threaded rod 126 to move through arm 16, as will be more fully described below. Preferably, the wiring is harnessed in a cable, for example a telescopic or extendable cable to accommodate the extended positions of the mirror subassembly, as would be understood by those skilled in the art.

In preferred form, mirror assembly 10 includes a driver assembly 124 to permit remote adjustment of the position of mirror subassembly 12 along support arm 16. As best seen in FIG. 10, driver assembly 124 includes a motor 125, transverse threaded rod 126, and a reduction gear 128 which is mounted on rod 126. Motor 125 is preferably housed in support arm 16 and includes a drive gear 134 for engaging reduction gear 128. For example, motor 125 may be mounted to upper or top wall 52a of arm 16. Threaded rod 126 is mounted to extend through aligned openings 118b provided in ribs 118 and further to extend through end wall 52d of bracket 16 through an opening 142 for mounting to end wall 144 of housing 18. Optionally, openings 118b may be threaded; however, to maintain the manual override option, described below, in preferred form, each of the openings 118b may include flexible threads or clutch fingers similar to reduction gear 128. Rod 126 is fixedly mounted to end wall 144, for example, by a mounting block 146. In this manner, when motor 125 is actuated, drive gear 134 engages reduction gear 128 to move up and down threaded rod 126 to thereby move mirror subassembly 12 along support bracket 16. Reduction gear 128 preferably includes a plurality of flexible threads or threaded fingers 138 for engaging the threads of rod 126. Fingers 138 form clutch fingers and release from rod 126 when a sufficient force is applied to housing 18 along axis 110 to permit manual adjustment of the position of mirror subassembly 12 along support arm 16 and, further, to provide a safety release in the event that there is an obstruction that prevents mirror subassembly 12 from moving along axis 110.

In order to further reduce the vibration of reflective element assembly 20, mirror assembly 10 includes one or more spring dampeners 150. Spring dampeners 150 comprise generally L-shaped members with a mounting flange 152 for securing to the rearward surface 50 of reflective element support holder 48 for example by an adhesive or the like. Projecting from mounting flange 152 is an arm 154 which includes a raised portion 156 for extending under a corresponding tab or flange 158 provided on actuator bracket 24. Arm 154 frictionally engages the lower surface 160 of tab 158, which is preferably recessed. In addition, free edge 162 of tab 158 includes a bulbous or enlarged portion 164 which guides arm 154 under tab 158 during the assembly process. Vibration dampener 150 acts as a spring and absorbs and dampens the vibration in reflective element assembly 20.

It can be understood from the foregoing that mirror subassembly 12 is selectively movable along support arm 16 so that mirror subassembly 12 can be positioned in a plurality of extended positions, including an outmost outboard position or towing position for viewing rearward portions of the vehicle, including towed objects. Additionally, mirror subassembly 12 can be retracted to a normal operating position close to the vehicle door. It should be understood further that the mirror subassembly 12 can be moved to an infinite number of positions between the fully retracted position to the fully extended position. Mirror subassembly 12 can be also pivoted about mounting bracket 14 between a normal operating position to a folded breakaway position close to the vehicle body. In addition, rearview mirror assembly 10 may include a power-fold mechanism. A "powerfold" mechanism is typically operated and actuatable/deactuatable from within the vehicle cabin either by a user operator switch or by a speed sensor that folds the mirror out when a predetermined vehicle velocity is sensed and that upon activation by the driver causes a folding portion of the exterior mirror assembly, for example housing 18, to fold or move or pivot about a fold-away axis, for example bushing 62, on a non-folding portion, for example bracket 14, of exterior mirror assembly 10, from its normally extended viewing position wherein mirror assembly 10 provides a field of view to a compact, folded position wherein the rearwardly facing side of the folding portion is disposed generally parallel to the vehicle body. "Powerfold" exterior rearview mirrors are conventional and, therefore, the specific details of the "powerfold" mechanisms are omitted herein. In many European countries, "powerfold" exterior rearview mirror assemblies are used during parking to reduce the width of the vehicle. Preferably and desirably, the powerfold mechanism operates when the mirror is in the retracted, non-extended position. If the mirror subassembly is electrically extendable, a control is preferably provided that retracts the mirror subassembly along the support arm to its retracted, non-extended position and then folds the mirror subassembly and support arm inwardly toward the vehicle. Alternatively, the entire arm and mirror subassembly may fold in, thus, folding the extended mirror subassembly, including a fully extended mirror subassembly. These and other features may be included in rearview mirror assembly 10.

For example, mirror subassembly 12 may incorporate a heater pad, for example the heater disclosed in U.S. Pat. No. 5,151,824, a signal light or security light disclosed in U.S. Pat. Nos. 5,669,705; 5,497,305; 5,497,306; 5,371,659; 5,669,704; 5,863,116 and copending application Ser. No. 09/102,414 filed Jun. 22, 1998, for VEHICLE EXTERIOR MIRROR SYSTEM WITH SIGNAL LIGHT, co-pending application Ser. No. 09/174,747 for UNIVERSAL EXTERIOR VEHICLE SECURITY LIGHT, filed Oct. 19, 1998, all commonly assigned to Donnelly Corporation of Holland, Mich., the disclosures of which are incorporated herein in their entireties. In addition, other electrical or electronic components may be mounted in housing 12 such as an interface transaction system described in U.S. pending patent application entitled A VEHICLE MOUNTED REMOTE TRANSACTION INTERFACE SYSTEM, filed by Martin DeVries and Niall R. Lynam on Apr. 8, 1998, Ser. No. 09/157,428, and/or an electronic module, which may include one or more electrical or electronic devices such as antennas, circuitry for rain sensors, heating elements and the like as described in pending U.S. patent application entitled MODULAR REARVIEW MIRROR ASSEMBLY INCLUDING ELECTRONIC MODULES, Ser. No. 08/702,228, filed Aug. 23, 1996, by Niall Lynam et al., now U.S. Pat. No. 6,019,475, and which are commonly assigned to Donnelly Corporation of Holland, Mich., the disclosures of which are herein incorporated by reference in their entireties. Other features which may be added to the vehicle mirror subassembly 12, include global positioning system antennas and/or receivers, as disclosed in commonly assigned U.S. patent application Ser. No. 08/569,851, filed Dec. 8, 1995, by Roger L. Veldman and Desmond O'Farrell for A VEHICLE GLOBAL POSITIONING SYSTEM NAVIGATIONAL AID, now U.S. Pat. No. 5,971,552; and blind spot detection systems, such as disclosed in U.S. Pat. Nos. 5,786,772 and 5,929,786, the disclosures of which are hereby incorporated herein by reference. Other features which may be incorporated or combined with the features of the present invention include blind spot detectors, sensors, for example control sensors for control circuit including control circuits for electrochromic elements, temperature sensors for controls or indicators, heading sensors; intelligent highway control systems (IHCS); intrusion detectors; antennas, such as the GPS antenna, car phone antennas, radio antenna and the like; microphones; speakers; garage door opener transmitters and antennas; an automatic toll booth payment system, such as a PASS™ system; transceivers; a node and/or controller for a vehicle multiplex and/or car area network; a remote transaction system; or telecommunication devices, such as ONSTAR™ found in General Motors' vehicles of Detroit, Mich., or RESCU™ available form Ford Motor Company of Detroit, Mich. In addition, one or more cameras may be incorporated into the rearview mirror assembly. These cameras may be forward or rearward facing depending on the application. For example, cameras may be used as part of a headlamp control system such as disclosed in U.S. Pat. No. 5,796,094, a rearview vision system for vehicles such as disclosed in U.S. Pat. No. 5,670,935 and in PCT Publication No. 96/38319, AN IMAGE CAPTURING SYSTEM, such as disclosed in pending U.S. patent application Ser. No. 09/199,909, filed Nov. 25, 1998, all commonly assigned to Donnelly Corporation of Holland, Mich. and incorporated by reference herein in their entireties. Also, a headlamp control from the type disclosed in commonly assigned U.S. Pat. No. 5,715,093 issued to Kenneth L. Schierbeek and Niall R. Lynam for AUTOMATIC REARVIEW MIRROR SYSTEM WITH AUTOMATIC HEADLIGHT ACTIVATION, the disclosure of which is hereby incorporated by reference, may be included in mirror subassembly 12. For other features, reference is made to U.S. Pat. No. 5,798,575, which is commonly assigned to Donnelly Corporation of Holland, Mich., the disclosure of which is incorporated in its entirety by reference herein.

Referring to FIG. 7, a second embodiment of mirror assembly 210 is illustrated. Mirror assembly 210 is of similar construction to mirror assembly 10 and includes a mirror subassembly 212, a support arm 216, and a mounting bracket 214 but includes a modified actuator bracket 224 and clamp assembly 294. Like numerals are used to indicate corresponding parts in mirror assembly 10. Actuator bracket 224 includes a body 224a with generally planar upper portion 302 and a lower J-shaped portion 304. Upper portion 302 includes a plurality of mounting bosses 240 that project outwardly from planar portion 302 for securing actuator 222 to actuator bracket 224. J-shaped portion 304 is offset from upper portion 302 by a connecting web 306. As best seen in FIG. 8, clamp assembly 294 includes a generally L-shaped clamp member 242 with a downwardly extending lip 243 for engaging an upwardly turned lip or flange 305 of lower portion 304 of body 224a. Clamp member 294 is rigidly mounted to actuator bracket 224 by fasteners 294b which extend into corresponding mounting holes or openings 294a on actuator bracket 224, similar to the previous embodiment. Clamp assembly 294 further includes a pair of wave springs 298 and 300 for urging support arm 216 into frictional engagement with clamp member 242. Clamp member 242 preferably comprises a metal clamp, for example a stainless steel clamp, to provide a planar and smooth surface and which provides for a smooth movement of support arm 216 through actuator bracket 224. In this embodiment, clamp 242 includes a pair of notches 314 and 316, similar to insert 96. Clamp assembly 294 operates in a similar manner to clamp assembly 94 and, therefore, reference is made therein for further details of the function of clamp assembly 294.

Referring to FIG. 9, a third embodiment of clamp assembly 494 is illustrated. Clamp assembly 494 includes a clamp member 442 with first and second angled mounting flanges 442a for mounting to corresponding mounting tabs 505 of actuator bracket 424. Similar to the previous embodiments, wave springs 498 and 500 are positioned between actuator bracket 424 and support arm 416 to urge support arm 416 into frictional engagement with clamp member 442. Mounting flanges 442a are secured to actuator bracket 424 by fasteners 494b and preferably include belleville or compression washers 494c to releasably lock the respective fasteners in a fully engaged position. In this manner, the respective fasteners will not come loose in response to the vibration associated with most exterior rearview mirror assemblies.

A fourth embodiment of the clamp assembly 694 and actuator bracket 624 is illustrated in FIGS. 10 and 11. Clamp assembly 694 comprises a clamp member 642 and a pair of wave springs 698 and 700. Similar to clamp member 242, clamp member 642 comprises a generally L-shaped clamp with a downwardly depending flange or lip 643 which engages a corresponding upwardly extending flange or lip 705 of actuator bracket 624. Projecting outwardly from upper planar portion 702 of actuator bracket 624 are a pair of threaded pins or studs 702a which extend into corresponding openings 645 provided in clamp 642. As best seen in FIG. 11, each opening 645 is formed at the center of a plurality inwardly extending radial tabs formed in clamp member 642. In this manner, studs 702a can be press fit into openings 645 and yet will be rigidly held in place by the radial tabs which respectively engage the threads on the respective studs 702a.

While several of the forms of the invention have been shown and described other forms will now become apparent to those skilled in the art. For example, the reflective assembly may include a single reflective element. Furthermore, the actuator may comprise a manual or remote controlled actuator, for example a BODEN cable actuator, as previously noted, and further, other break-away mechanisms may be employed in mounting bracket assembly 14. In addition, although the present invention is described as including single or mono support arm, the concept of the invention may be used with dual mounting or support arms as well. Changes and modification to the specifically described embodiments can be carried out without departing from the principles of the invention, which is intended to be limited only by the scope of the claims as interpreted according to principles of patent law including the Doctrine of Equivalents. Therefore, it will be understood that the embodiments shown in the drawings and described above are merely for illustrative purposes only and are not intended to limit the scope of the invention which is defined by the claims that follow.

I claim:

1. An extendable exterior rearview mirror assembly comprising:

a mounting bracket for mounting to a vehicle;

a mirror subassembly having a housing and a reflective element;

a support arm mounted for pivotal movement on said mounting bracket from a normal operating position toward a folded position, said support arm having a longitudinal axis, said longitudinal axis extending laterally outward from the vehicle when said mounting bracket is mounted to a vehicle and said support arm is in said normal operating position; and a clamping assembly mounted in said housing, said clamping assembly comprising a biasing member and a bearing member, said mirror subassembly being mounted on said support arm by said clamping assembly for selective movement on said support arm along said longitudinal axis of said support arm to at least one extended viewing position spaced from a fully retracted position, and said biasing member providing a spring force, said spring force providing frictional engagement between said bearing member and said support arm to releasably clamp said mirror subassembly on said support arm to limit movement of said mirror subassembly along said longitudinal axis of said support arm, said support arm moving relative to said biasing member and said bearing member when a sufficient force is applied to said mirror subassembly wherein said mirror subassembly moves relative to said support arm along said longitudinal axis of said support arm to adjust the viewing position of said mirror subassembly.

2. The extendable exterior rearview mirror assembly according to claim 1, wherein said mirror subassembly further comprises an actuator, said actuator supporting said reflective element in said housing of said mirror subassembly and providing adjustment to the orientation of said reflective element about at least one axis.

3. The extendable exterior rearview mirror assembly according to claim 2, wherein said mirror subassembly further comprises an actuator bracket, said actuator bracket mounting said actuator in said housing of said mirror subassembly, and said actuator bracket including said bearing member.

4. The extendable exterior rearview mirror assembly according to claim 2, wherein said actuator comprises an electric actuator.

5. The extendable exterior rearview mirror assembly according to claim 1, wherein said biasing member comprises at least one plate spring, said plate spring having an undulating cross-section and urging said support arm into frictional engagement with said bearing member, and said undulating cross-section absorbing manufacturing tolerances of said support arm.

6. The extendable exterior rearview mirror assembly according to claim 5, wherein plate spring comprises a first plate spring, said biasing member including a second plate spring, said second plate spring having an undulating cross-section and together with said first plate spring urging said support arm into frictional engagement with said bearing member.

7. The extendable exterior rearview mirror assembly according to claim 3, wherein said actuator bracket includes a clamp, said clamp including said bearing member and supporting said support arm and said biasing member.

8. The extendable exterior rearview mirror assembly according to claim 7, wherein said actuator includes a body, said clamp comprising an L-shaped clamp, said L-shaped clamp providing said bearing member, said L-shaped clamp and said body of said actuator bracket defining a longitudinal passage, said support arm extending in said longitudinal passage, and said biasing member urging said support arm into frictional engagement with said clamp.

9. The extendable exterior rearview mirror assembly according to claim 8, wherein said biasing member comprises a plate spring having an undulating cross-section, said plate spring biasing said support arm into frictional engagement with said clamp.

10. The extendable exterior rearview mirror assembly according to claim 8, wherein said bearing member includes a metal bearing surface, said biasing member urging said support arm into frictional engagement with said metal bearing surface.

11. The extendable exterior rearview mirror assembly according to claim 10, wherein said actuator bracket includes a metal insert between said support arm and said clamp, said metal insert providing said metal bearing surface, and said biasing member urging said support arm into frictional engagement with said metal insert.

12. The extendable exterior rearview mirror assembly according to claim 1, further comprising a driver assembly, said driver assembly selectively moving said mirror subassembly along said support arm.

13. The extendable exterior rearview mirror assembly according to claim 12, wherein said driver assembly includes a threaded rod extended through said support arm and mounted to said mirror subassembly, and a drive motor, said drive motor driving said threaded rod and moving said mirror subassembly along said support arm.

14. The extendable exterior rearview mirror assembly according to claim 13, wherein said driver assembly further includes a reduction gear, said reduction gear being mounted on said threaded rod, and said driver motor engaging said reduction gear for driving said mirror subassembly along said support.

15. The extendable exterior rearview mirror assembly according to claim 13, wherein said threaded rod is fixably mounted to said mirror subassembly.

16. The extendable exterior rearview mirror assembly according to claim 13, wherein said driver assembly further includes a clutch, said clutch drivingly decoupling said motor from said threaded rod to provide a manual override of said drive motor.

17. An extendable exterior rearview mirror assembly comprising:
a mounting bracket for mounting to a vehicle;
a mirror subassembly having a housing, a reflective element, and an actuator supporting said reflective element in said housing, said actuator being mounted to said housing by an actuator bracket, said bracket including a bearing member;
a biasing member; and
a support arm supported by said mounting bracket, said support arm having a longitudinal axis extending laterally outward from the vehicle when the mirror assembly is mounted to the vehicle, said mirror subassembly being mounted by said actuator bracket for selective movement on said support arm along said longitudinal axis of said support arm to at least one extended viewing position spaced from a fully retracted position, said biasing member providing a spring force, said spring force providing frictional engagement between said bearing member of said actuator bracket and said support arm to releasably clamp said mirror subassembly on said support arm to limit movement of said mirror subassembly along said longitudinal axis of said support arm, said support arm moving relative to said bearing member and said biasing member when a sufficient force is applied to said mirror subassembly wherein said mirror subassembly moves relative to said support along said longitudinal axis of said support arm to adjust the viewing position of said mirror subassembly.

18. The extendable exterior rearview mirror assembly according to claim 17, wherein said actuator comprises an electrical actuator, said electrical actuator providing adjustment of said reflective element about at least one axis.

19. The extendable exterior rearview mirror assembly according to claim 17, wherein said reflective element comprises a first reflective element, and said mirror subassembly having a second reflective element, and one of said first and second reflective elements comprising a convex reflective element.

20. The extendable exterior rearview mirror assembly according to claim 17, wherein said biasing member comprises a plate spring, said plate spring having an undulating cross-section and urging said support arm into frictional engagement with said bearing member while absorbing manufacturing tolerances of said actuator bracket and said support arm.

21. The extendable exterior rearview mirror assembly according to claim 20, wherein said actuator bracket includes a longitudinal passage, said support arm extending into said longitudinal passage and being urged into frictional engagement with said bearing member by said biasing member.

22. The extendable exterior rearview mirror assembly according to claim 21, wherein said actuator bracket includes a clamp, said clamp providing said bearing member, said bearing member and said biasing member frictionally holding said support arm in said longitudinal passage to limit the movement of said mirror subassembly along said support arm.

23. The extendable exterior rearview mirror assembly according to claim 22, wherein said clamp comprises an L-shape member, said biasing member comprising a pair of wave springs, said clamp clamping said support arm against said wave springs such that said wave springs bias said support arm into frictional engagement with said bearing member.

24. The extendable exterior rearview mirror assembly according to claim 23, wherein said bearing member is interposed between said clamp and said support arm, said bearing member having a smooth planar surface.

25. The extendable exterior rearview mirror assembly according to claim 24, wherein said bearing member comprises a metal bearing member.

26. The extendable exterior rearview mirror assembly according to claim 24, wherein said bearing member comprises a L-shaped member.

27. The extendable exterior rearview mirror assembly according to claim 17, wherein said support arm is mounted for pivotal movement on said mounting bracket between a normal operating position and a folded position.

28. The extendable exterior rearview mirror assembly according to claim 17, wherein said support arm includes a stop, said stop limiting movement of said mirror subassembly along said support arm.

29. The extendable exterior rearview mirror assembly according to claim 17, further comprising a driver assembly, said driver assembly selectively moving said mirror subassembly along said support arm.

30. The extendable exterior rearview mirror assembly according to claim 29, wherein said driver assembly includes a motor, said motor being supported by said support arm.

31. The extendable exterior rearview mirror assembly according to claim 29, wherein said driver assembly includes a clutch, said clutch drivingly decoupling said driver assembly from said mirror subassembly whereby said mirror subassembly can be manually moved along said support arm.

32. An extendable exterior rearview mirror assembly comprising:
a mounting bracket for mounting to a vehicle;
a mirror subassembly having a housing, a reflective element having a rearward field of view, and an actuator supporting said reflective element in said housing to provide repositioning of said reflective element, said actuator being mounted to said housing by an actuator bracket; and
a support arm supported by said mounting bracket said support arm having a longitudinal axis extending laterally outward from a vehicle when said mirror assembly is mounted to the vehicle, said actuator bracket including a bearing member and at least one biasing member, said biasing member providing a spring force, said spring force urging said support arm into frictional engagement with said bearing member to releasably clamp said mirror subassembly and said actuator bracket on said support for selective movement on said support arm along said longitudinal axis of said support arm to at least one extended viewing position spaced from a fully retracted position and to limit movement of said mirror subassembly along said support arm, said support arm moving relative to said biasing member and said bearing member when a sufficient force is applied to said mirror subassembly wherein said mirror subassembly moves relative to said support arm along said longitudinal axis of said support arm to change said rearward field of view.

33. The extendable exterior rearview mirror assembly according to claim 32, wherein said actuator bracket includes a transverse passage, said bearing member positioned in said passage, and said support arm extending into said transverse passage to frictionally engage said bearing member.

34. The extendable exterior rearview mirror assembly according to claim 33, wherein said biasing member is positioned in said passage for urging said support arm into frictional engagement with said bearing member.

35. The extendable exterior rearview mirror assembly according to claim 34, wherein said biasing member comprises a wave spring, said spring extending through said passage for urging said support arm into frictional engagement with said bearing member.

36. The extendable exterior rearview mirror assembly according to claim 35, wherein said actuator bracket further includes a clamp, said clamp urging said support arm against said wave spring.

37. The extendable exterior rearview mirror assembly according to claim 32, wherein said support arm comprises a hollow support arm, said hollow support arm being reinforced by a plurality of webs.

38. The extendable exterior rearview mirror assembly according to claim 37, wherein said webs include a plurality of openings, said openings being aligned to form at least one transverse passage through said support arm, said transverse passage through said support arm providing a wire routing for electrical devices in said mirror subassembly.

39. The extendable exterior rearview mirror assembly according to claim 32, wherein said actuator comprises an electric actuator, said electric actuator providing adjustment of said reflective element about at least one axis.

40. The extendable exterior rearview mirror assembly according to claim 32, wherein said reflective element comprises a first reflective element, said mirror subassembly having a second reflective element, and at least one of said first and second reflective elements comprising a convex reflective element to provide a spotting mirror.

41. The extendable exterior rearview mirror assembly according to claim 32, wherein said reflective element comprises a variable electro-optic element.

42. The extendable exterior rearview mirror assembly according to claim 32, wherein said actuator bracket comprises a plastic actuator bracket.

43. The extendable exterior rearview mirror assembly according to claim 41, wherein said first and second reflective elements are supported on a reflective element holder, said actuator supporting said reflective element holder and said first and second reflective elements in said mirror subassembly.

44. The extendable exterior rearview mirror assembly according to claim 32, wherein said mounting bracket includes a pair of mounting flanges, said support arm being mounted between said mounting flanges by a pivot bushing, and said pivot bushing being journaled in both said upper and lower mounting flanges to thereby improve the vibration characteristics of said extendable exterior rearview mirror assembly.

45. An extendable exterior rearview mirror assembly comprising:
  a mounting bracket adapted for mounting to a vehicle;
  a mirror subassembly having a housing and a reflective element;
  a mono support arm mounted on said mounting bracket; and
  a biasing member, said mirror subassembly further having a passage, said support arm extending into said passage and supporting said mirror subassembly thereon, said support arm being mounted for selective movement through said passage whereby said mirror subassembly moves along said support arm to one of at least two viewing positions, said biasing member urging said support arm into frictional engagement with said mirror subassembly to limit movement of said mirror subassembly along said support arm.

46. The extendable exterior rearview mirror assembly according to claim 45, wherein said mirror subassembly includes an actuator and an actuator support for mounting said actuator in said housing, said reflective element being mounted to said actuator, and said actuator providing adjustment of the position of said reflective element in said housing.

47. The extendable exterior rearview mirror assembly according to claim 46, wherein said actuator bracket includes said passage, said biasing member urging said support arm into frictional engagement with said actuator bracket to limit movement of said mirror subassembly along said support arm.

48. The extendable exterior rearview mirror assembly according to claim 47, wherein said biasing member comprises a plate spring having an undulating cross-section, said undulating cross-section absorbing manufacturing tolerances of said support arm and said actuator bracket.

49. The extendable exterior rearview mirror assembly according to claim 48, wherein said actuator comprises an electric actuator.

50. The extendable exterior rearview mirror assembly according to claim 45, wherein said mono support arm is mounted for pivotal movement on said mounting bracket from a normal operating position toward a folded position.

51. The extendable exterior rearview mirror assembly according to claim 50, wherein said movement of said mirror subassembly along said support arm is independent from said pivotal movement of said support arm about said mounting bracket.

* * * * *

UNITED STATES PATENT AND TRADEMARK OFFICE
CERTIFICATE OF CORRECTION

| | | |
|---|---|---|
| PATENT NO. | : 6,116,743 | Page 1 of 1 |
| APPLICATION NO. | : 09/399875 | |
| DATED | : September 12, 2000 | |
| INVENTOR(S) | : Steven G. Hoek | |

It is certified that error appears in the above-identified patent and that said Letters Patent is hereby corrected as shown below:

Column 5:
Line 33, Insert --52-- after "opening"

Signed and Sealed this

Seventh Day of July, 2009

JOHN DOLL
*Acting Director of the United States Patent and Trademark Office*